United States Patent
Stunkard

(10) Patent No.: US 8,601,634 B1
(45) Date of Patent: Dec. 10, 2013

(54) PIG VALVE HAVING TRUNNION SUPPORTED BALL, SELF-CENTERING SEATS AND UNIVERSAL TYPE MOUNTING FLANGES

(76) Inventor: Gerald A. Stunkard, Jenks, OK (US)

( * ) Notice: Subject to any disclaimer, the term of this patent is extended or adjusted under 35 U.S.C. 154(b) by 0 days.

(21) Appl. No.: 13/507,613

(22) Filed: Jul. 13, 2012

(51) Int. Cl.
*F16L 55/46* (2006.01)

(52) U.S. Cl.
USPC . 15/104.062; 137/268; 251/180; 251/315.01; 251/315.1

(58) Field of Classification Search
USPC ............ 15/3.5, 3.51, 104.061, 104.062; 137/242, 244, 268; 251/180, 181, 185, 251/172, 315.01, 315.1
See application file for complete search history.

(56) References Cited

U.S. PATENT DOCUMENTS

| | | | | |
|---|---|---|---|---|
| 3,125,116 A | * | 3/1964 | Schaberg | 137/268 |
| 3,146,792 A | * | 9/1964 | Donnelly et al. | 137/614.17 |
| 3,177,513 A | * | 4/1965 | Ellett | 15/104.062 |
| 3,220,432 A | * | 11/1965 | Allen | 137/268 |
| 3,288,163 A | * | 11/1966 | Craven | 137/242 |
| 3,463,448 A | * | 8/1969 | Piccardo | 251/159 |
| 3,784,155 A | * | 1/1974 | Tomlin | 251/181 |
| 3,895,776 A | * | 7/1975 | Laurens | 251/148 |
| 4,016,621 A | * | 4/1977 | Slegers et al. | 15/104.062 |
| 4,066,240 A | * | 1/1978 | Atkinson et al. | 251/175 |
| 4,111,229 A | * | 9/1978 | Christian | 137/614.17 |
| 5,277,248 A | * | 1/1994 | Breland | 166/70 |
| 5,752,690 A | * | 5/1998 | Ellett | 251/152 |
| 6,079,074 A | * | 6/2000 | Ellett | 15/104.062 |
| 7,690,626 B2 | * | 4/2010 | Stunkard | 251/174 |
| 2005/0173665 A1 | * | 8/2005 | Kemp | 251/180 |

* cited by examiner

*Primary Examiner* — Mark Spisich

(57) ABSTRACT

A pig launching and retrieval valve, which is adapted to be mounted within a pipeline for fluid flow control and for inserting and retrieving pig devices, such as round nosed cylinders, balls, scrapers and the like, for pipeline cleaning, for separation of fluids within the pipeline and for other pipeline inspection and servicing activities. The pig valve is of universal nature, having sub flanges for adaptation of special flange mounting and/or API standard flange mounting. The pig valve has a trunnion supported valve ball and pressure energized seat members that are enabled to shift laterally within respective seat recesses and thus establish self-centering with the valve ball.

20 Claims, 8 Drawing Sheets

PIG VALVE HAVING TRUNNION SUPPORTED BALL, SELF-CENTERING SEATS AND UNIVERSAL TYPE MOUNTING FLANGES

BACKGROUND OF THE INVENTION

1. Field of the Invention

The present invention relates generally to pig valves, which are used for fluid flow control and for inserting pig devices, such as bullet shaped pigs, balls, scrapers and the like, into pipelines for internal cleaning, for separation of fluids within the pipeline and for other pipeline inspection and servicing activities. More particularly, the present invention concerns a rotatable ball type pig valve having universal type mounting flanges. The pig valve mechanism has a trunnion supported valve ball and incorporates seat members that are enabled to shift laterally within respective seat recesses and thus establish a self-centering characteristic with respect to the substantially spherical surface of a valve ball member during valve use.

2. Description of the Prior Art

Pig valves are regularly used for inserting pig devices into pipelines and retrieving the pig devices from the pipelines. Pig devices take a variety of different forms, such as "bullet pigs" of cylindrical configuration, with a rounded leading end, ball devices, scraper devices, and the like. Pig devices are passed through pipelines for the purpose of cleaning deposits, line scale and other foreign matter that might have accumulated within a pipeline or may have become adhered to the inner wall surface of the pipeline. Pigs are also used to separate a liquid or gas material from another liquid or gas material to prevent differing materials from becoming mixed as they flow through a pipeline. Certain pig devices are also run through pipelines for inspection of the structural integrity of the material from which a pipeline is composed.

Pig valves can be of various types, including ball valves, gate valves, rotary plug, valves. Pig launching and retrieving systems may include pig launchers, which are not valves, but which employ various types of valves to enable a pig member to be inserted into a pipeline. Pig traps are mechanisms that are mounted in communication with pipelines and which function to catch and secure a pig member after it has completed its passage through a pipeline.

An example of a ball type pig valve is set forth in U.S. Pat. No. 5,752,690 of Ellett.

SUMMARY OF THE INVENTION

It is a principal feature of the present invention to provide a novel universal pig valve in the form of a ball valve that has pressure responsive seats that are self-centering with respect to the substantially spherical surface of the valve ball member thereof.

It is another feature of the present invention to provide a novel universal pig valve that is adapted for connection within a pipeline by means of various types of mounting mechanisms such as weld-neck flanges, bolt compression flanges or any mounting mechanism that is typically utilized for installation of valves in flow lines.

Briefly, the various objects and features of the present invention are realized through the provision of a ball type universal pig valve having self-centering seats. The seat assemblies are supported on the back side by a cylindrical seat support ring that has circumferential grooves for sealing elements, such as O-rings, against the body inside diameter or the inside diameter of the seat retainer. The seat ring has a smaller outside diameter than the inside diameters of the body and seat retainer, and thus defines a radial clearance that permits lateral shifting of the seat rings. This self-shifting feature permits the seat rings to shift laterally to a position to self-center relative to the generally spherical sealing surface of the valve ball regardless the position of the ball axially at assembly or axial movement during service. The flat surfaces of the seat ring and the seat support ring permit lateral shifting of the seat members so that efficient sealing engagement of the seat rings on the sealing surface of the valve ball is maintained at all times. A face groove on the front side of the seat support ring accepts a sealing element such as an O-ring. It is understood, however, that the face groove could just as well be provided in the back face of the seat ring.

Also, this concept provides for more even wear against the seat sealing insert sealing against the ball. Other valves, when installed with the product flow horizontal, can create uneven wear against the seat sealing element from the weight of the ball wearing against the lower portion of the seat sealing element. This eventually requires seat replacement which is costly from parts cost and, down time from service.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is an isometric illustration, showing a pig valve mechanism that is constructed in accordance with the principles of the present invention;

FIG. 2 is a side elevation view, showing the pig valve mechanism of FIG. 1 with the valve actuator stem thereof oriented laterally;

FIG. 3 is an end elevation view, showing the pig valve mechanism of FIGS. 1 and 2;

FIG. 4 is a section view taken along line 4-4 of FIG. 3, and showing nominal clearance of the self-centering seat rings with the valve ball member centered within the valve chamber;

FIG. 4a is an end view taken along line 4a-4a of FIG. 4 and showing a universal flange member, provided with tapped holes for API mounting of the valve and showing bolted mounting of sub flanges FIG. 5 is a section view taken along line 5-5 of FIG. 2, showing stem and trunnion actuation and support for the valve ball member;

FIG. 6 is a section view similar to the view of FIG. 4, but showing the clearance change of the self-centering seat rings with the valve ball member shifted to an off center position within the valve chamber;

FIG. 7 is a fragmentary section view of the pig valve mechanism of FIGS. 1-5, showing the seat and seat support mechanism in greater detail;

FIGS. 8-12 are descriptive sectional views showing insertion and launching of a pig member, utilizing the pig valve mechanism of FIGS. 1-6; and FIGS. 13-17 are descriptive sectional views showing the pig valve mechanism of the present invention being employed to catch and permit extraction of a pig member.

DETAILED DESCRIPTION OF PREFERRED EMBODIMENT

Figure 1:
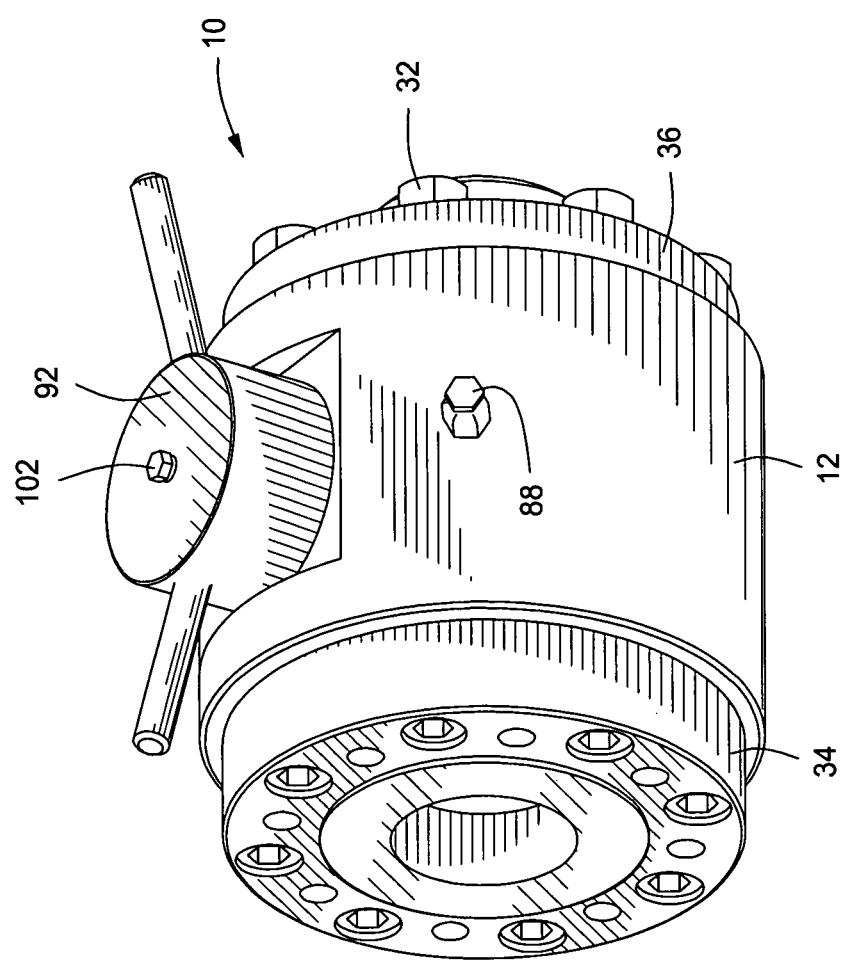
Figure 3:
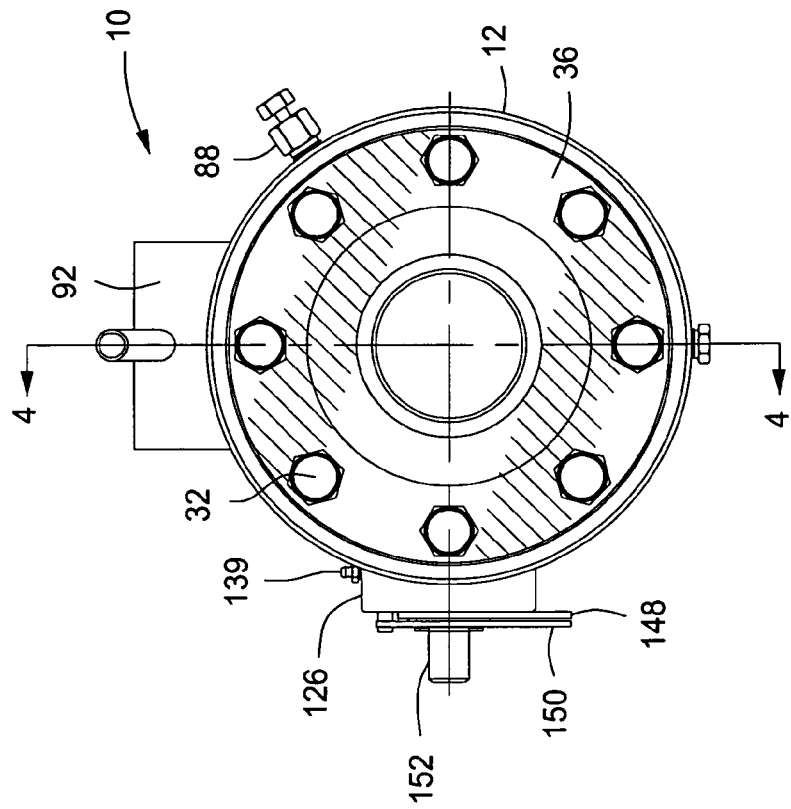

Referring now to the drawings and first to FIGS. 1-5, a universal pig valve having self-centering seats is shown generally at 10 and incorporates an annular valve body member 12 that defines a valve chamber 14. Within the valve chamber a valve ball member 16 having a generally spherical external sealing surface 18, is mounted for rotation by an actuating stem and trunnion assembly which is discussed in greater detail below in connection with FIG. 5. The valve ball member 16 defines a port or flow passage 20 having an internal cylindrical surface 22 of a dimension that is sufficient to receive a pig member 24 which is shown in the operational illustrations of FIGS. 8-17.

The valve body member 12 defines axial end portions 26 and 28 that have threaded screw openings and receive cap screw members 30 or retainer bolts 32 for securing mounting flange members 34 and 36 to the valve body member 12. Mounting flange member 34 is a universal flange having tapped holes 31 for API mounting of the valve mechanism 10 and incorporating bolt holes 33 having internal shoulders and tapped threads for sub flange mounting. The flange members each define flange openings or passages 35 and 37 respectively, which open to the flow passage of the pipeline within which the valve mechanism is mounted. The mounting flange member 34 is described as a sub flange to enable the valve mechanism to be positioned between and sealed to the flanges of a pipeline. The mounting flange member 36 is described as a weld neck flange which enables the valve mechanism to be welded within a pipeline. For an actual valve installation, however, both flanges would be substantially identical.

The axial ends 26 and 28 of the valve body 12 are internally threaded as shown at 38 and 40 and receive externally threaded sections of seat retainer members 42 and 44. The seat retainer members each define openings 46 which receive an installation and removal tool, such as a spanner wrench, thereby permitting threading and unthreading of the seat retainer members during assembly and disassembly operations. Seat retainer body seals 48 and 50, such as resilient O-ring seal members, establish sealing between the seat retainer members and the valve body. The Seat retainer body seals are secured in place by annular retainer flanges 52 which project radially beyond the threads of the valve body and seat retainer and are engaged within annular receptacles that are defined by the valve body 12. The seat retainer members 42 and 44 define annular external seal recesses within which are received annular body back-up seal members 54 that have sealing engagement with an inner annular surface 56 of the valve body member 12. For sealing between the seat retainer members and the respective valve mounting flanges 34 and 36 an annular face seal member 58, such as an O-ring seal, is received within an annular seal groove that is defined by the seat retainer member and establishes sealing with a planar surface of the valve mounting flange. The face seal member, however, could be received with a face seal groove of the mounting flange, if desired.

Figure 7:
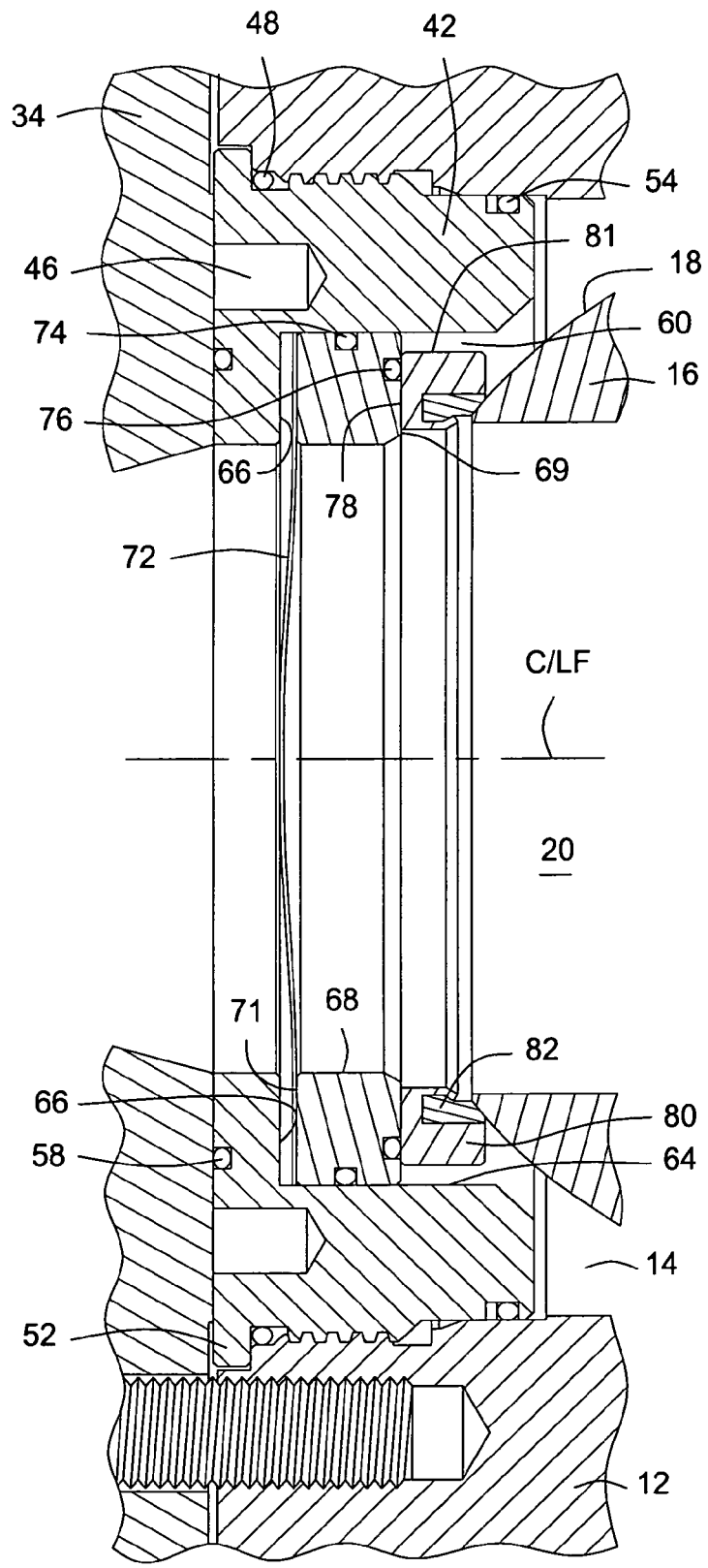

The seat retainer members 42 and 44 define seat pockets 60 and 62, best shown in FIG. 7, which are each defined by an internal cylindrical surface 64 that has intersecting relation with a radially oriented planar surface 66. Seat support rings 68 and 70 are received within the seat pockets 60 and 62 and are urged toward the valve ball member by spring members 72. The spring members preferably take the form of wave springs, though other types of spring members may be employed. Radial seal members 74, such as resilient O-ring seals, are carried within external annular seal grooves of the seat support rings 68 and 70 and establish sealing with the cylindrical seat pocket surface 64 of the seat support rings and permit axial movement of the seat support rings within the seat pockets 60 and 62 in response to valve ball movement within the valve chamber 14 and in response to line pressure.

Face seal members 76 are supported within circular seal grooves of the seat support rings and define pressure responsive surface areas and are engaged by planar surfaces 78 of annular seat members or rings 80 Also, the radial seals 74 establish pressure responsive surface areas of the seat support rings that are greater at the back face portions of the seat support rings, as compared with the pressure responsive areas at the face portions of the seat support rings thus establishing a pressure responsive resultant force that urges the seat support rings and thus urges the seat rings 80 in a direction that is toward the valve ball member. The seal rings 80 define face seal recesses within which are located annular face seal members 82 that define sealing surfaces having sealing engagement with the spherical sealing surface 18 of the valve ball member 16. The annular face seal members 82 may be composed of a wide range of acceptable sealing materials, such as a resilient or rubber-like sealing material, a polymer sealing material, such as Teflon®, or a suitable metal sealing material. An inner rim 84 of the seat rings is preferably deformed after the annular face seal member has been installed within the seal groove, thus providing for mechanical locking of the seal member 82 within the seal groove of the seat ring 80.

Figure 5:
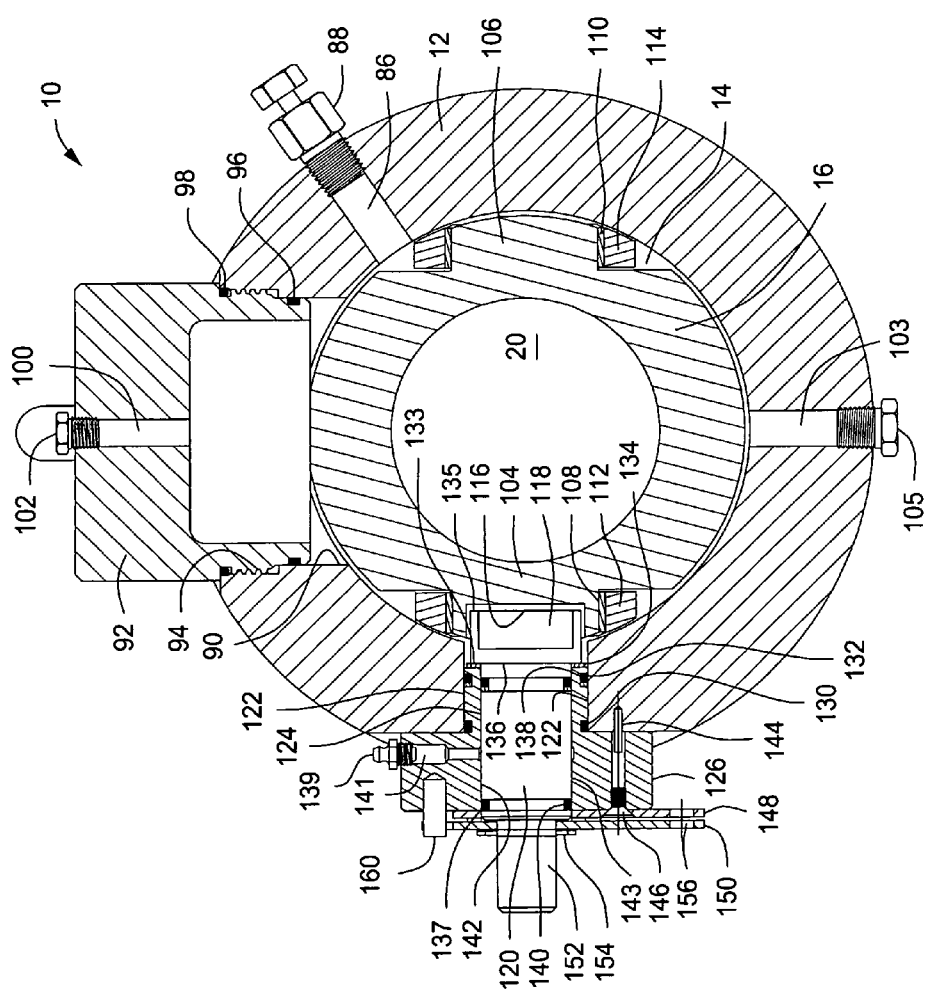

Referring now to FIG. 5, the valve body 12 defines a valve chamber vent passage 86 which is in communication with the valve chamber 20. A vent or body bleed fitting 88 is threaded into the valve chamber vent passage 86 and is adjustable between a closed position and an open position permitting venting of fluid pressure from the valve chamber 20. Opening of the fitting 88 is done to perform a test known as "double block and bleed" for confirming the sealing integrity of both the upstream and downstream seat assemblies. Opening of the bleed fitting, with the valve ball in its closed position is also necessary when a pig member is to be inserted into a pipeline or removed from the pipeline, since the valve chamber will be at atmospheric pressure.

Figure 9:
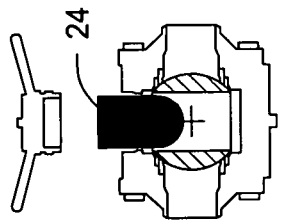
Figure 10:
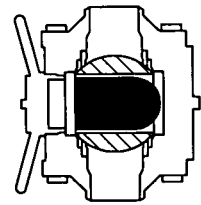
Figure 11:
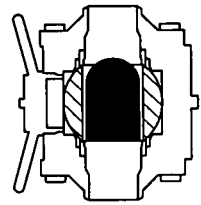

The valve body 12 also defines a pig entry or extraction opening 90 having an internal cylindrical wall surface section. An externally threaded closure plug member 92 is received by an internally threaded section 94 of the pig entry or extraction opening 90. With the valve ball member 16 rotated to a position aligning the port or flow passage 20 of the valve ball member with the a pig entry or extraction opening 90, such as is shown in the operational illustrations 8-10, and with the closure plug member 92 removed, as shown in FIG. 9, a pig member 24 is inserted through the entry or extraction opening 90 and into the port or flow passage 20. The closure plug member 92 will then be threaded into place, as shown in FIG. 10, thus closing and sealing the valve chamber 14. As shown in FIG. 11, the valve ball member will then be rotated to its pig launching position, aligning the pig member 24 with the mounting flange passages and permitting flowing fluid, liquid, gas or both, to propel the pig member into the pipeline, downstream of the valve.

Figure 14:
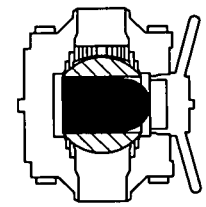
Figure 16:
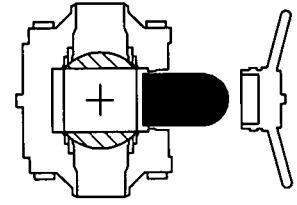
Figure 17:
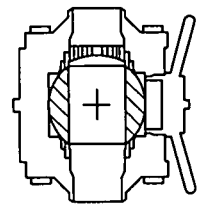

For pig extraction from the pipeline a downstream pig valve, substantially identical with the pig insertion valve of FIGS. 8-12, will be provided with a pig stop member 95 in the form of a screen or grate that permits the flow of fluid but will not allow a pig member to pass. The pig stop member also positions the pig member within the port or flow passage 20 of the valve ball 16 of the pig valve mechanism, so that rotation of the valve ball causes rotation of the pig member into alignment with the pig entry or extraction opening 90, as shown in FIG. 14. With the pig member so positioned for extraction, the valve chamber is bled to atmospheric pressure and the closure plug member 92 is unthreaded and removed as shown in FIG. 16. With the pig member removed, the closure plug member 92 will again be installed and the valve ball member can be rotated to its open position to permit flow of fluid through the valve mechanism and will be prepared to receive the next pig member to be propelled through the pipeline from the pig insertion valve.

An inner plug or bonnet seal member 96 is retained with an annular external seal groove of the plug or bonnet member 92 and establishes sealing with the internal cylindrical wall surface section of the pig entry or extraction opening 90. An outer plug or bonnet seal member 98 is retained within a circular external seal groove of the plug member 92 and also establishes sealing between the plug member 92 and the valve body 12 at the outer portion of the pig entry or extraction opening 90. The plug member 92 defines a vent passage 100 that is in communication with the valve chamber 20 and is normally closed by a vent plug member 102 that is threaded into an outer portion of the vent passage 100. The vent plug 102 is unthreaded from the plug member 92 to ensure that no pressure remains within the valve body or valve chamber that could pose a danger to a worker during pig insertion or pig extraction. Vent plug members are located in the pig insertion and extraction opening plug member 92 and in the valve body since the valve mechanism may be inverted for ease of pig extraction, as shown in FIGS. 12-17. Also, if desired, a pressure gauge may be threaded into either of the threaded openings for the pipe plug members 102 and 105 to provide a visual indication of the pressure condition of the valve chamber.

The valve ball member 16 defines opposed trunnion members 104 and 106 each having external cylindrical surfaces about which are positioned trunnion bearing members 108 and 110. Bearing retainer members 112 and 114 are positioned about the trunnion bearing members and maintain alignment of the valve ball member when it is rotated between its pig receiving position, with the valve port or passage 20 substantially aligned with the pig entry or extraction opening 90 and its pig launching position, with the valve port or passage 20 oriented in substantial alignment with the flange openings or passages 35 and 37, which are aligned with the flow passage of the pipeline within which the valve mechanism is mounted.

The trunnion member 104 defines a non-circular valve stem receptacle 116 within which a non-circular drive portion 118 of a rotatable valve stem 120 is located. The valve body 12 further defines a valve stem passage 122 having a valve stem seal projection 124 of a bonnet member 126 positioned therein and being sealed to the internal cylindrical surface of the valve stem passage by means of annular seal members 130 and 132. A valve stem thrust bearing 134 is positioned between the annular end surface of the valve stem seal projection 124 and a shoulder surface 136 of the valve stem to minimize wear of the valve stem as it is urged outwardly by any pressure that is present within the valve chamber.

Stem seal members 138 and 140, which are positioned within spaced annular seal retainer grooves of the valve stem member 120, establish sealing between the valve stem and the internal surface 142 of a stem passage that extends through the bonnet member 126 and its stem seal projection 124. A bonnet seal member or stem weather seal 137 is received within a circular seal groove of the valve stem 120 and establishes a seal with the cylindrical inner surface 142 of the bonnet member. The valve stem 120 is also subject to lubrication via a stem lubricant fitting 139 that is received by the outer internally threaded extent of a lubricant supply passage 141 that is defined within the bonnet member 126. The lubricant from the fitting 139 is injected into the annulus between the valve stem and the valve stem passage, between the annular stem seal members 138 and 140. The lubricant serves to minimize the rotational torque of opening and closing valve movement and can also serve as an additional sealant in the event either of the stem seals should become worn to the point of leakage.

A bonnet alignment pin 144 is positioned within a pin receptacle of the bonnet member 126 and extends into a bonnet alignment opening of the valve body and serves to establish a predetermined position of the bonnet member relative to the valve body. A lock plate retainer screw 146 extends into an opening of a lock plate member 148 and establishes predetermined substantially immovable position of the lock plate member, relative to the valve body. A stop plate member 150 has a central non-circular opening that is received by the correspondingly non-circular end portion 152 of the valve stem 120. A retainer member 154 is engaged within an annular retainer groove of the valve stem member 120 and serves to secure the stop plate member in non-rotatable relation with the valve stem member, so that the stop plate member is rotatable along with the valve stem.

Figure 2:
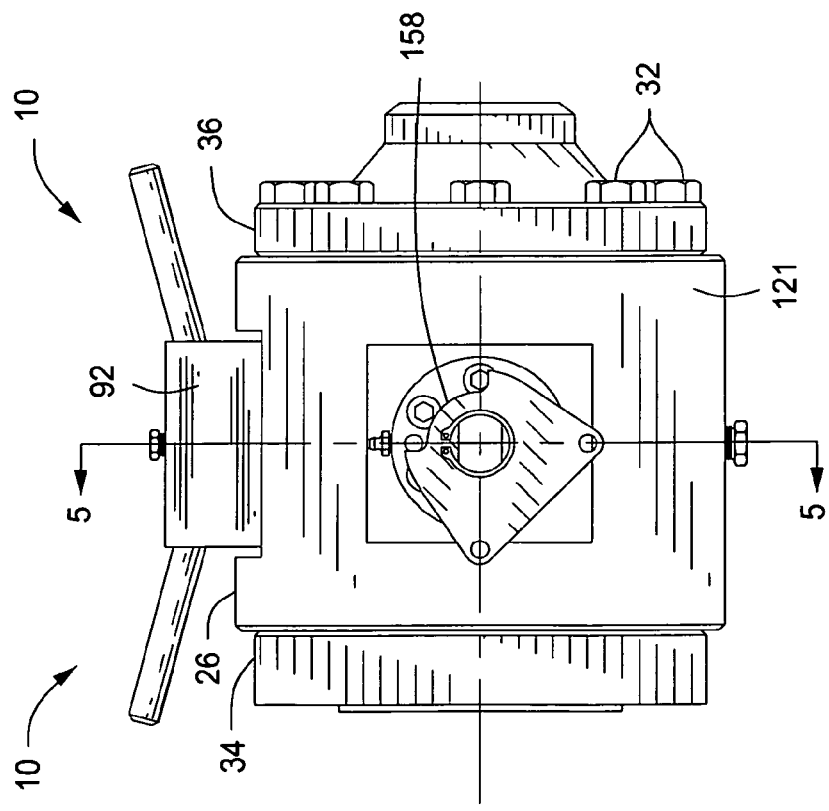

The lock plate and stop plate members each define lock openings 156 which are in registry at the fully open and fully closed positions of the valve mechanism and can receive a lock member for locking the valve mechanism to prevent its unauthorized opening or closing movement. The stop plate member, as shown in FIG. 2, defines an arcuate valve positioning recess 158 of substantially 90° angular dimension, with positioning stop shoulders at each end of the arcuate recess. These stop shoulders are disposed for engagement with a stop pin 160 at each end of the substantially 90° arcuate travel, thus establishing precision stop positions for the valve ball member at its fully open and closed conditions.

The pig valve mechanism of the present invention provides a number of important features that establish optimum serviceability and efficiency for commercial use. These features are as follows:

Self Centering Seats—

The seat retainer members 42 and 44 each define seat pockets having generally cylindrical radial seat pocket surfaces 64 that is of greater radial dimension as compared with the generally cylindrical outer peripheral surfaces 81 of the seat ring members. Thus, radial clearance exists between the outer peripheries of the seat rings and the inner peripheral surfaces 62 and 64 of the seat pockets. The seat ring members are thus permitted to shift laterally within limits that are defined by this clearance.

Figure 4:
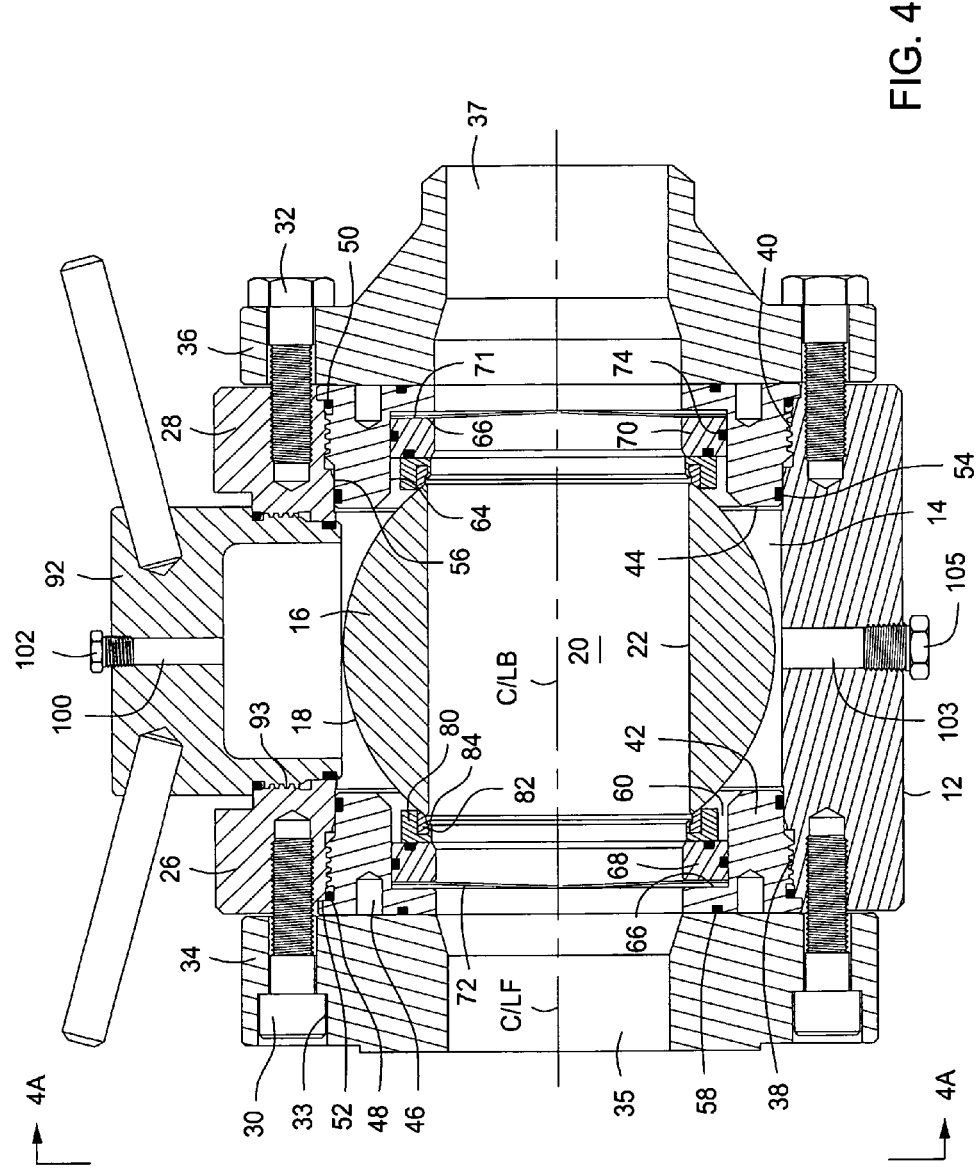
Figure 6:
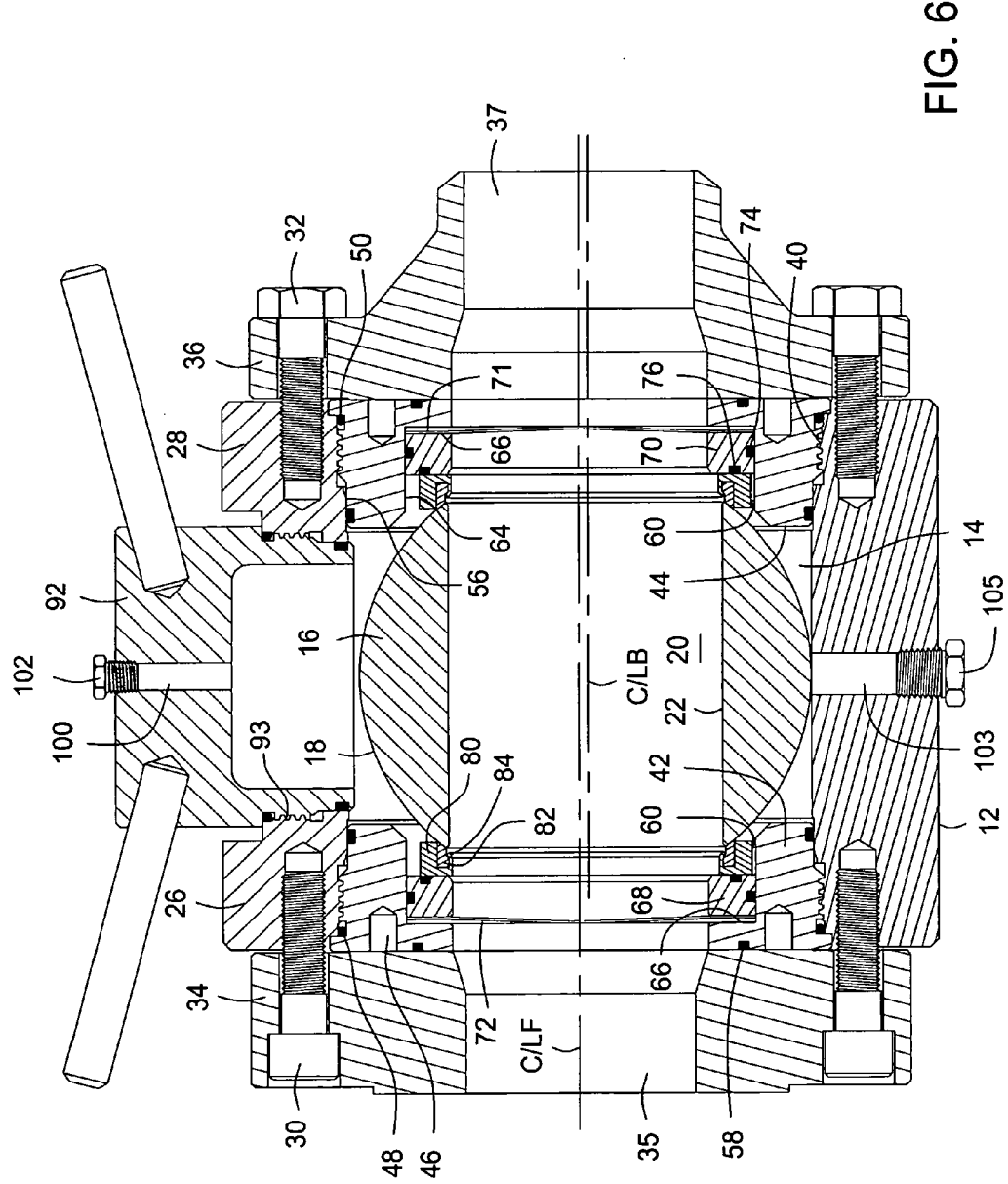

Note that the seat ring clearance is different in the views of FIGS. 4 and 6, the difference being that the seat rings shown in FIG. 6 have shifted from a position of nominal or equal clearance in FIG. 4 to a position of unequal clearance, as shown in FIG. 6. As shown in FIG. 4 the valve ball member is centered within the valve body such that the center-line of the valve ball, C/L B and the center-lines C/L F of the valve support flanges 34 and 36 are co-extensive. In this case the seat ring members 80 will be centered and thus the outer peripheries of the seat rings will have nominal or substantially equal clearance with the cylindrical seat pocket surface 62. Should the valve ball member 16 shift laterally within the valve chamber, as shown in FIG. 6, the seat ring members 80 will also shift laterally by an equal amount, so that effective sealing of the face sealing members 82 will be maintained. The outer peripheral surfaces of the seat rings will have unequal clearance with the cylindrical surface 62 of the seat pocket. This feature ensures against uneven loading of the face seal members with respect to the spherical sealing surface of the valve ball and prolongs the effective service life of the seat assemblies and minimizes the torque force that is required to rotate the valve ball member.

The self-centering seat activity occurs because the seat assemblies are both spring and pressure energized and have the capability for lateral movement within the seat pockets of the seat retainer members. As shown in FIG. 7, and in the views of FIGS. 4 and 6, the seat support ring members 68 and 70 each have a back face surface 71 and the seat retainer members 42 and 44 each define a seat pocket or recess 60 and 62 having a radially oriented planar surface 66. A wave spring member is positioned within the seat recess and is interposed between the surfaces 66 and 71 and urges the seat support rings 68 toward the valve ball member 16 within the limits of the wave spring. The seat support ring members 68 further define a radially oriented generally planar face surface 69 which is disposed in engagement with a radially oriented back face surface 78 of the seat ring 80. Thus, the seat rings are each enabled to move radially or laterally with respect to the centerline C/L F of the body mounting flanges. The seat recess 60 is defined in part by a generally cylindrical surface 64 which is of greater internal diameter as compared with the diameter of the outer peripheral surface 81 of the seat rings. This feature permits the seat rings 68 and 70 of each have the capability for moving laterally or radially within the seat recess and valve chamber and thus being laterally moveable for maintaining a self-centering relationship with the spherical sealing surface 18 of the valve ball member 16 when the valve ball moves laterally within the valve chamber as shown in FIG. 6.

Spring and Pressure Energized Seat Assemblies—

The seat support ring members 68 are each urged toward the valve ball member by wave springs 72, which also urge the seat ring members 80 into sealing engagement with the valve ball. Thus, sealing of the seat rings with the valve ball is continuously accomplished mechanically, so that the seat rings always establish initial sealing with the valve ball even when the valve chamber 14 and the flow passages 31 and 35 are subject to little or no fluid pressure. Additionally, the seat assemblies are pressure energized so that sealing contact of the seat assemblies with the valve ball is directly responsive to the pressure of the flow line. The seat support ring members 68 each have outer peripheral seals 74 that establish a backface surface dimension that is greater than the face surface dimension that is established by sealing engagement of the annular face seal members 82 of the seat rings 80 with the spherical sealing surface 18 of the valve ball member 16. Thus, a resultant force is established on the seat support ring members that maintains the seat support ring members and the seat ring members in sealing engagement with the valve ball member.

Double Block and Bleed—

With the valve ball member 16 rotated to its closed position, the valve chamber is isolated from the flow passages of the mounting flanges 34 and 36 and the pipeline within which the valve mechanism is mounted. The vent or body bleed fitting 88 is then actuated to its "vent" position, thereby bleeding fluid pressure from the valve chamber. In the event either of the seat assemblies is determined to be leaking from excessive wear or damage, fluid pressure will continue to be discharged from the open vent fitting, thus providing an indication that the sealing integrity of the seat assemblies has become degraded and thus repair or replacement of the valve seat assemblies of the valve mechanism must be scheduled. If some seat or seal leakage is determined to be occurring via the valve stem passage 142 of the bonnet member 126, a lubricant composition may be injected into the annulus 143 between the valve stem 120 and the wall of the valve stem passage, between the spaced seals 137 and 138 to enhance the sealing capability of the seal members. Typically, double block and bleed testing is done periodically to ensure the sealing integrity of both of the seat assemblies.

Safe Seat Retainer Mechanism—

The seat retainers 42 and 44 of the valve mechanism are secured within the valve body 12 by threads 38 of significant structural integrity for safe seat retainer retention, even under circumstances where the flange retainer cap screws or bolts 30 and 32 might be yielded by line strain force, excessive pressure, fire damage or for any other reason. The seat inserts therefore function as closure structures for each axial end of the valve chamber 14 and, when the valve ball member 16 is closed, ensures that the valve chamber is completely isolated from both the upstream and downstream flow passages of the pipeline and the flow ports of the valve mounting flanges.

Fire-Safe Valve Mechanism—

In order to meet fire safe standards, and thus maintain a sealing capability in the event the polymer and/or elastomer sealing members are caused to fail by the excessive heat of a fire, it is necessary that a metal-to-metal sealing capability be established in the event of seal failure so that combustible material of the pipeline will not leak from the valve and contribute to the fire. The seat rings 80 and the seat support rings 68-70 are composed of metal and have metal surfaces that are arranged to establish sealing engagement with other metal surfaces if the seal rings should be destroyed by excessive heat. The valve ball, though supported by trunions and trunnion bearings, is capable of being moved downstream by line pressure and thus the spherical sealing surface 18 of the valve ball 16 will establish metal-to-metal sealing engagement with the downstream seat ring if the face seals 82 become damaged by excessive heat, to the point of leakage. As shown in FIG. 4, the threaded closure plug 92 for the pig access opening is secured directly to the valve body member 12 by heavy and durable acme threads 93 so that heat expansion will not permit the closure plug member 92 to blow out from the valve body and suddenly release valve chamber pressure. Additionally, as shown in FIG. 5, the valve stem member 120 defines an outwardly facing retainer shoulder 136 that is positioned in engagement with the lower extremity of a valve stem seal projection 124 so that the valve stem is retained against blow-out and the valve stem has metal-to-metal engagement with the valve stem seal projection.

Low Torque Valve Operation—

The annular seat members have an annular sealing member that can be composed of a low friction material such as Teflon® that has minimal surface contact with the spherical sealing surface 18 of the valve ball member 16, thus minimizing the required torque on the valve stem for operational movement of the valve ball member 16. The low torque character of the valve mechanism is also provided by valve stem lubrication and valve body lubrication.

Valve Stem Lubrication—

The valve bonnet member 126 is provided with a lubricant fitting 139 that is mounted by threaded connection at the opening of a lubricant passage. For valve stem lubrication and for lubricant enhance stem sealing, lubricant is injected into the annulus of the valve stem passage, and between the spaced stem seal members 138 and 140. Lubrication of the valve stem mechanism in this manner, effectively minimizes the torque that is required for valve operation. In the event either of the stem seal members 138 and 140 should become worn to the point of leakage, the lubricant material will enhance the sealing capability of the stem seal members.

Blow-Out Proof Valve Stem Mechanism—

As shown in FIG. 5, the bonnet member 126 has a valve stem seal projection that extends into the valve stem passage 122 and defines an annular stem retainer shoulder 133 that faces the valve chamber 14. The inner enlargement 135 of the valve stem has an annular stop shoulder surface 136 that is retained by the annular stem retainer shoulder 136, thus preventing the valve stem from being blown from the valve body by internal pressure within the valve.

Universal Valve Mounting—

Figure 4A:
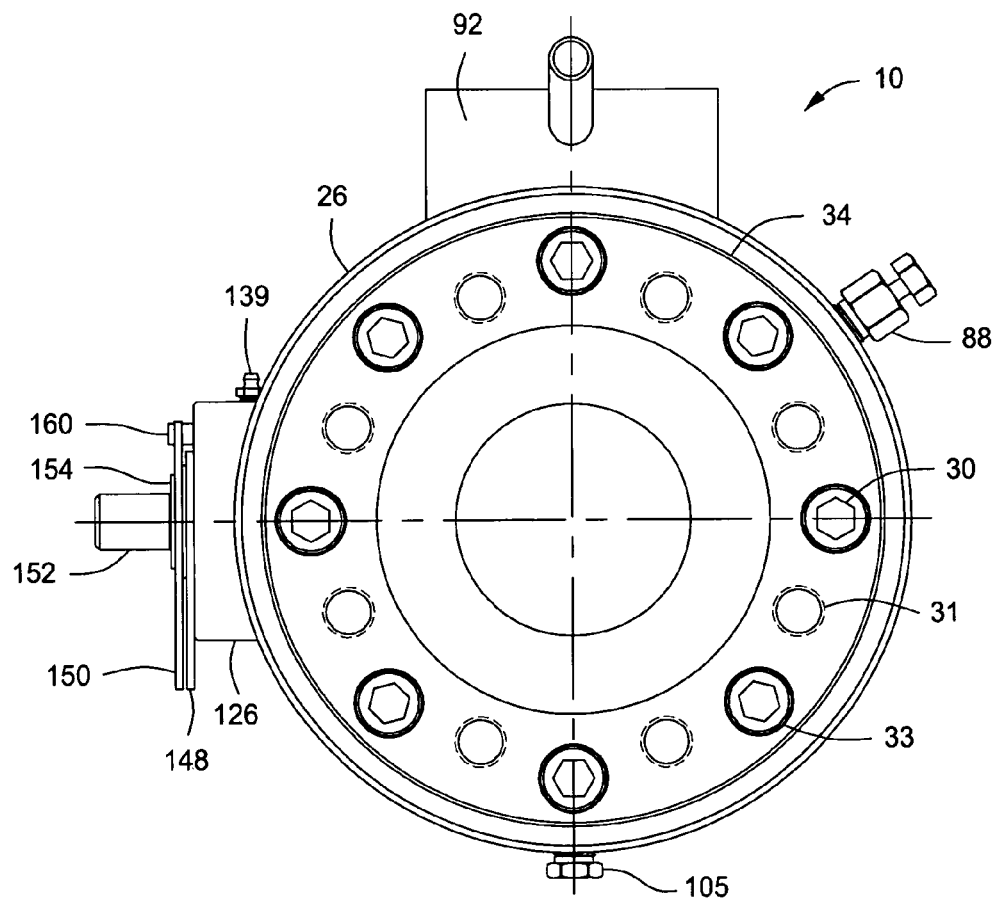

As shown in FIGS. 4 and 4a, it is to be understood that valve mounting is accomplished by mounting flanges that can be identical or can be different, depending on the pipeline conditions that exist. As shown at the right side portion of FIGS. 4 and 6, weld end flanges, such as shown at 36 may be mounted to the valve body ends 26 and 28 by means of threaded bolts 32 or threaded stud and nut assemblies. If desired, universal flanges, such as shown at 34 are provided with tapped holes 31 to permit API mounting of the flanges by means of bolts or stud and nut assemblies and are provided with bolt holes having internal bolt stop shoulders and internal threads for sub flange mounting to the valve body by means of cap screws. These valve mounting features may be selected for independent or collective use as desired, thus providing for universal mounting of the pig valve mechanism. This feature also minimizes the number of mounting flange components that will typically be needed for valve installation in a pipeline.

Operation

Figure 8:
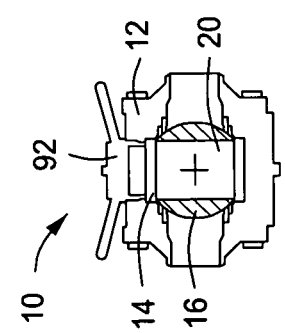

With reference to FIGS. 8-12 pig insertion and launching is illustrated. In FIG. 8 the universal pig valve mechanism of the present invention is shown with the valve ball 16 in its closed position, isolating the flow port of the valve ball and the valve chamber from the flow passages that are defined by the mounting flanges and the pipeline within which the valve mechanism is mounted. When the valve ball is rotated from the open position shown in FIGS. 4-6 to the closed position shown in FIGS. 8-10, the flow port or passage 20 of the valve ball will be aligned with the pig insertion and extraction opening 90 of the valve body 12. For pig insertion the fluid pressure within the isolated valve chamber 14 is relieved by opening the vent or bleed fitting 88 of the valve body. After the pressure within the valve chamber has been bled to atmospheric pressure, it will be safe to remove the closure plug member 92 from its threaded engagement with the internally threaded portion of the valve body at the pig insertion and extraction opening 90.

If, when the valve chamber is vented by opening the body vent or bleed fitting 88, venting of the valve chamber continues, even though the volume of vented fluid may be small, an indication is provided that the seals of one or both of the valve seat assemblies have become worn or degraded to the point that seal leakage is occurring. In this case, the valve mechanism should be repaired. If the seal leakage is extremely small, pig insertion may be done if the leakage rate is within predetermined safe limits. To further ensure that the valve chamber has been vented to atmospheric pressure, either or both of the vent plugs 102 and 105 can be unthreaded from the vent passage openings and removed. As mentioned above, the vent plug 102 of the closure plug member 92 may be removed to ensure venting of any gas that might enter the valve chamber and the vent plug 105 may be unthreaded from the valve body passage 103 to provide a venting function and to drain any liquid and collected debris from the valve chamber Especially during valve ball closure for double block and bleed testing and for pig insertion, the valve ball is capable of some radial or lateral movement as indicated by the offset center-lines C/L F and C/L B in FIG. 6. When this condition occurs, the seat ring members 80 will also shift radially or laterally and continue to maintain optimum self-sealing sealing engagement with the spherical sealing surface 18 of the valve ball member 16. Shifting of the seat member is permitted by the planar face surface 69 of each seat support ring which engages the planar back face surface 78 of the seat ring provided axial support for the seat as shown in FIG. 7. These planar surfaces provide for axial support of the seat ring but permit radial movement of the seat ring as it follows or achieves self-centering with respect to corresponding movement of the valve ball member. This self-centering characteristic of the seat rings will change the clearance of the outer peripheries of the seat rings with the internal cylindrical surface 64 of the seat pockets 60 from nominal clearance as shown in FIG. 4 to unequal clearance as shown in FIG. 6. The contact area of the sealing members of the seat rings with the spherical sealing surface of the valve ball will remain equal at all times and there will be no tendency for excessive wear of the seat ring seals. This feature also ensures that the torque that is required for valve ball movement will remain as low as possible, even when the valve ball has become shifted laterally within the valve chamber.

Figure 12:
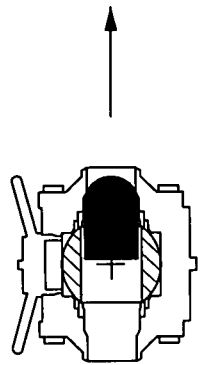

With reference to FIG. 9, the valve ball is shown to be rotated to its closed and pig receiving position and a bullet type pig member 24 is shown in the process of being inserted through the open pig entry or extraction opening 90, the plug member 92 having been unthreaded and removed. With the pig member in place within the flow passage 20 of the valve ball member, the plug member 92 will be threaded into the internally threaded closure plug receptacle 94 and the valve ball member will be rotated from the pig insertion position of FIG. 10 to the pig launching position shown in FIG. 11. The pressure of fluid, such as gas, liquid or a mixture of gas and liquid, will then propel the pig member into the pipeline, downstream of the universal pig valve of the present invention as shown in FIG. 12.

Figure 13:
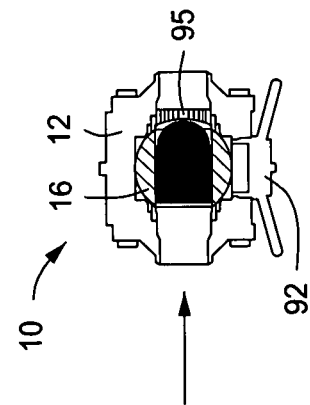

After the pig member has passed through the pipeline a universal pig valve that differs only in that it is provided with a pig stop screen or grate 95, is employed on the downstream side of the valve ball to stop or catch the pig member and position the pig member within the flow passage 20 of the valve ball member 16 as shown in FIG. 13. Though the universal pig valve 10 of FIGS. 13-17 is shown to be inverted from the position shown in FIGS. 8-12 it is not mandatory that it be so positioned. The inverted positioning of FIGS. 13-17 is generally deemed to be proper for efficiency of removing bullet type pig members and ball type pig members from the valve.

Figure 15:
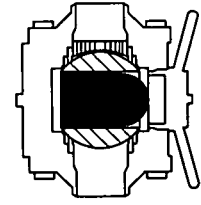

As shown in FIG. 14, the valve ball member 16 is rotated to its closed position, thus positioning the pig member 24 for removal. The valve chamber 14 is then bled to atmospheric pressure, as shown in FIG. 15, by first opening the body bleed fitting 88. One or both of the plug members 102 and 105 may also be removed to ensure that no pockets of pressure remain within the valve body. Opening of these plug members may be appropriate to drain away any residual gas or liquid constituents. Thereafter, the pig access closure plug 92 may be unthreaded and removed, as shown in FIG. 16, to permit the pig member 24 to simply drop from the valve ball flow passage 20. With the pig member removed, the pig access closure plug 92 will again be threaded into the pig access opening 94, readying the valve mechanism for catching or stopping a subsequent pig member that is propelled through the pipeline by the flowing fluid medium.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A universal pig valve mechanism, comprising:
   a valve body defining a valve chamber and having a pig access opening in communication with said valve chamber, said valve body defining a longitudinal axis and having opposed axial ends;
   valve mounting members extending from said axial ends of said valve body for mounting said universal pig valve mechanism in a pipe line, each valve mounting member having a flow passage in communication with said valve chamber;
   a seat retainer member being mounted within an axial end of said valve body and defining an annular seat recess having an internal substantially cylindrical seat recess surface of defined diameter and having a lateral seat recess surface oriented in transverse relation with said internal substantially cylindrical seat recess surface and with said longitudinal axis;
   a closure member being removably mounted to said valve body and normally closing said pig access opening, said closure member being removable for pig insertion and removal;
   a valve ball member being mounted for rotation within said valve chamber and defining a substantially spherical external sealing surface and having a valve ball flow passage permitting a pig member to be inserted therein, said valve ball member being rotatable within said valve chamber to a flow position permitting fluid flow through said valve ball flow passage and a pig loading and retrieving position permitting movement of a pig member into and from said valve ball flow passage;
   a seat support member being sealed to said internal substantially cylindrical seat recess surface and being linearly moveable within said seat recess, said seat support member defining an annular planar seat support surface facing said valve ball member and being oriented in transverse relationship with said longitudinal axis; and
   a seat ring member being moveable within said seat recess and having an outer periphery of less diameter than said defined diameter, said outer periphery having external clearance with said internal substantially cylindrical seat recess surface, said seat ring member being moveable linearly by force transmitted thereto by said seat support member and being moved laterally within said seat recess by force received from said valve ball member upon lateral movement of said valve ball member, and providing said seat ring member with a self-centering and sealing relationship with said substantially spherical external sealing surface of said valve ball member.

2. The universal pig valve mechanism of claim 1, comprising:
   said seat ring having a substantially planar back face surface being in contact with said substantially planar seat support surface of said seat support member, said substantially planar back face surface and said substantially planar face surface permitting lateral and linear movement of said seat ring and establishing said self-centering relationship of said seat ring member with respect to said substantially spherical external sealing surface of said valve ball member.

3. The universal pig valve mechanism of claim 1, comprising:
   said seat ring establishing a defined seal diameter with said substantially spherical external sealing surface of said valve ball member; and
   said seat support establishing a pressure responsive seal diameter with said seat retainer member that is greater than said defined seal diameter and developing a pressure responsive force urging said seat support toward said seat ring and said valve ball member.

4. The universal pig valve mechanism of claim 1, comprising:
   said valve mounting members comprising universal mounting flanges being selectively mounted to said valve body and adapting said valve body for special mounting or standard API mounting in a pipeline.

5. The universal pig valve mechanism of claim 1, comprising:
   said valve body defining an internally threaded section; and
   said seat retainer member having threaded engagement with said internally threaded section and being sealed with respect to said valve body.

6. The universal pig valve mechanism of claim 1, comprising:
   said seat ring being composed of metal and defining an annular face seal groove and an annular metal sealing surface;
   an annular face seal member being located within said annular face seal groove and having sealing engagement with said substantially spherical sealing surface of said valve ball member; and
   in the event of destruction of said annular face seal member by excessive heat, said seat ring being moved by pressure into and positioning said annular metal sealing surface of said seat ring in metal-to-metal sealing engagement with said substantially spherical external sealing surface of said valve ball member.

7. The universal pig valve mechanism of claim 1, comprising:
   said valve body defining a bleed passage in communication with said valve chamber; and
   a bleed fitting being mounted to said valve body at said bleed passage and having a closed position preventing escape of pressure from said valve chamber and having an open position permitting bleeding of pressure from said valve chamber.

8. The universal pig valve mechanism of claim 1, comprising:
   said valve body defining a valve stem passage;
   opposed trunnion members being defined by said valve ball member;
   trunnion bearing members engaging said trunnion members and said valve body and supporting said valve ball member for rotation with said valve body;
   a valve stem member being positioned for rotational movement within said valve stem passage and having rotational driving engagement with said valve ball member; and a stem control member being mounted to said valve stem and limiting rotational movement of said valve stem and said valve ball member to a rotational increment of substantially 90°, from said flow position to said pig loading and retrieving position.

9. The universal pig valve mechanism of claim 8, comprising:
said mounting members comprising universal mounting flanges being selectively mounted to said valve body and adapting said valve body for special mounting or standard API mounting in a pipeline.

10. The universal pig valve mechanism of claim 8, comprising:
said valve stem having an enlargement defining a stop shoulder; and
a bonnet member being mounted to said valve body and having a tubular bonnet extension being received in sealed relation within said valve stem passage, said bonnet member and said bonnet extension defining a passage receiving said valve stem member in sealed and rotationally moveable relation therein, said bonnet extension defining a retainer shoulder being engaged by said stop shoulder of said valve stem and preventing said valve stem from being blown from said valve stem passage by pressure within said valve chamber.

11. The universal pig valve mechanism of claim 10, comprising:
spaced stem seal members maintaining sealing of said valve stem member within said passage of said bonnet member and said bonnet extension and defining an annulus between said spaced stem seal members;
a lubricant passage extending through said bonnet member to said annulus; and
a lubricant fitting being mounted to said bonnet member in communication with said lubricant passage and permitting injection of lubricant through said lubricant fitting into said annulus for lubrication and sealing of said valve stem.

12. The universal pig valve mechanism of claim 10, comprising:
a stem stop member being defined by said bonnet member; and
said stem control member being a stem rotation control plate member being in non-rotatable relation with said valve stem member and establishing stem rotation stop positions reflecting said flow position and said pig loading and retrieving position.

13. A universal pig valve mechanism, comprising:
a valve body having a valve chamber and defining a pig access opening in communication with said valve chamber, said valve body defining a longitudinal axis and having opposed axial ends;
a closure member being removably mounted to said valve body and normally closing said pig access opening, said closure member being removable for pig insertion and removal;
valve mounting members extending from said opposed axial ends of said valve body for mounting said universal pig valve mechanism in a pipe line, each valve mounting member having a flow passage in communication with said valve chamber;
a seat retainer member being mounted within said valve body and defining an annular seat recess having an internal generally cylindrical seat recess surface of defined diameter and having a back surface;
a valve ball member being mounted for rotation within said valve chamber and defining a substantially spherical external sealing surface and having a ball flow passage permitting a pig member to be inserted therein, said valve ball member being rotatable to a flow and pig catching and launching position permitting fluid flow through said ball flow passage and a pig loading and retrieving position in alignment with said pig access opening permitting movement of a pig member into and from said ball flow passage;
a seat support ring member being located within said seat recess and having an outer periphery thereof in linearly moveable sealed engagement with said inner generally cylindrical seat recess surface and having a generally planar face surface oriented toward said valve ball member and in substantially perpendicular relation with said longitudinal axis; and
a seat ring member being moveable within said seat recess and having an outer periphery of less diameter than said defined diameter and having external clearance with said internal generally cylindrical seat recess surface, said seat ring being moveable linearly and laterally within said seat recess and having a self-centering relationship with said substantially spherical external sealing surface of said valve ball member, said seat ring having a substantially planar back face surface being in contact with said substantially planar face surface of said seat support ring member, said substantially planar back face surface and said substantially planar face surface permitting lateral movement of said seat ring member relative to said seat support ring member responsive to lateral movement of said valve ball member and permitting maintenance of said self-centering relationship of said seat ring member with respect to said substantially spherical external sealing surface of said valve ball member.

14. The universal pig valve mechanism of claim 13, comprising:
said mounting members comprising universal mounting flanges being selectively mounted to said valve body and adapting said valve body for weld end mounting, special mounting and standard API mounting in a pipeline.

15. The universal pig valve mechanism of claim 13, comprising:
said seat support ring establishing a pressure responsive seal diameter and being responsive to line pressure for developing a pressure responsive force urging said seat support ring toward said seat ring and said valve ball member.

16. The universal pig valve mechanism of claim 13, comprising:
said valve body defining an internally threaded section; and
said seat retainer member having threaded engagement with said internally threaded section and being in sealed engagement.

17. The universal pig valve mechanism of claim 13, comprising:
said seat ring member being composed of metal and defining an annular face seal groove and a metal face sealing surface;
an annular face seal member being located within said annular face seal groove; and
said seat ring being moved by pressure and positioning said metal face sealing surface in metal-to-metal sealing engagement with said substantially spherical external sealing surface of said valve ball member in the event of destruction of said annular face seal member by excessive heat.

18. The universal pig valve mechanism of claim 13, comprising:
   said valve body defining a bleed passage in communication with said valve chamber; and
   a bleed fitting being mounted to said valve body at said bleed passage and having a closed position preventing escape of pressure from said valve chamber and having an open position permitting bleeding of pressure from said valve chamber.

19. The universal pig valve mechanism of claim 13, comprising:
   said valve body defining a valve stem passage;
   opposed trunnion members being defined by said valve ball member;
   trunnion bearing members supporting said opposed trunnion members of said valve ball member for rotation of said valve ball member within said valve body;
   a valve stem member being positioned for rotational movement within said valve stem passage and having rotational driving engagement with said valve ball member; and
   a stem control member being mounted to said valve stem member and limiting rotational movement of said valve stem member and said valve ball member to a rotational increment of substantially 90°, from a pig insertion position to a pig launching position.

20. The universal pig valve mechanism of claim 19, comprising:
   said valve stem member having an enlargement defining a stop shoulder;
   a bonnet member being mounted to said valve body and having a tubular bonnet extension being received in sealed relation within said valve stem passage, said bonnet member and said bonnet extension defining a passage receiving said valve stem member in sealed and rotationally moveable relation therein, said bonnet extension defining a retainer shoulder being engaged by said stop shoulder of said valve stem member and preventing said valve stem member from being blown from said valve stem passage by pressure within said valve chamber;
   spaced stem seal members maintaining sealing of said valve stem member within said passage of said bonnet member and said bonnet extension and defining an annulus between said spaced stem seal members;
   a lubricant passage extending through said bonnet member to said annulus;
   a lubricant fitting being mounted to said bonnet member in communication with said lubricant passage and permitting injection of lubricant through said lubricant fitting into said annulus for lubrication and sealing of said valve stem member;
   a stem stop member being defined by said bonnet member; and
   said stem control member being a stem rotation control plate member being in non-rotatable relation with said valve stem member and establishing stem rotation stop positions reflecting said pig insertion and pig launching positions of said valve ball member.

* * * * *